No. 664,811. Patented Dec. 25, 1900.
D. LIPPY.
SCREEN OR RIDDLE FOR SEPARATORS.
(Application filed Sept. 13, 1899.)

(No Model.)

WITNESSES.
O. B. Benziger,
M. A. Martin

INVENTOR.
David Lippy.
By R. B. Wheeler & Co.
Attorneys.

THE NORRIS PETERS CO., PHOTO-LITHO., WASHINGTON, D. C.

UNITED STATES PATENT OFFICE.

DAVID LIPPY, OF MANSFIELD, OHIO, ASSIGNOR, BY DIRECT AND MESNE ASSIGNMENTS, TO THE LIPPY MANUFACTURING COMPANY.

SCREEN OR RIDDLE FOR SEPARATORS.

SPECIFICATION forming part of Letters Patent No. 664,811, dated December 25, 1900.

Application filed September 13, 1899. Serial No. 730,339. (No model.)

*To all whom it may concern:*

Be it known that I, DAVID LIPPY, a citizen of the United States, residing at Mansfield, in the county of Richland, State of Ohio, have invented certain new and useful Improvements in Screens or Riddles for Separators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to screens or riddles for separators; and it consists in the construction and arrangement of parts hereinafter fully set forth, and pointed out particularly in the claim.

The object of the invention is to produce simple and efficient means for separating all kinds of grain and seeds, the arrangement being such as to evenly distribute the grain, allow of an unobstructed passage of the air-blast through the bars of the sieve, and because of the adjustment of the parts enable the separating of all kinds of grain or seeds upon a single sieve. This object is attained by the mechanism illustrated in the accompanying drawings, in which—

Figure 1:
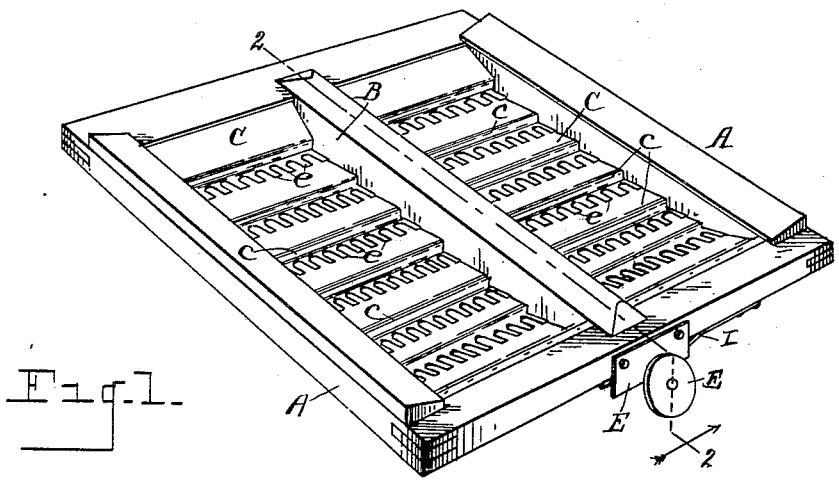
Figure 2:
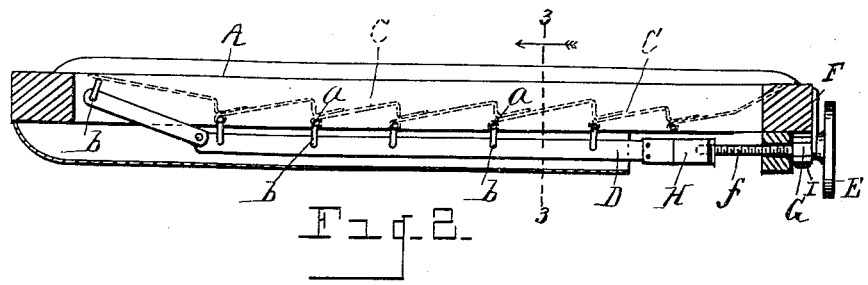
Figure 3:
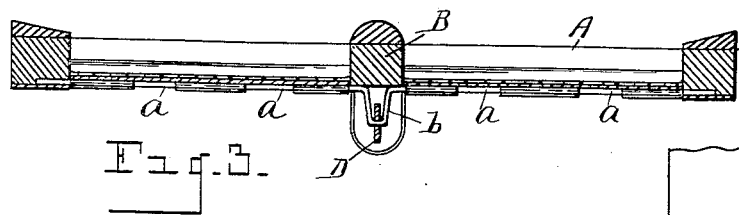
Figure 4:
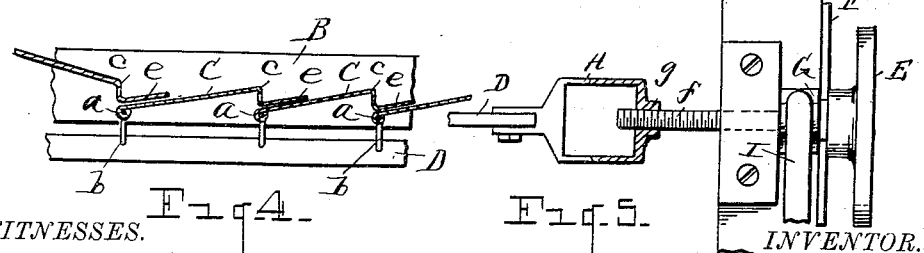
Figure 5:
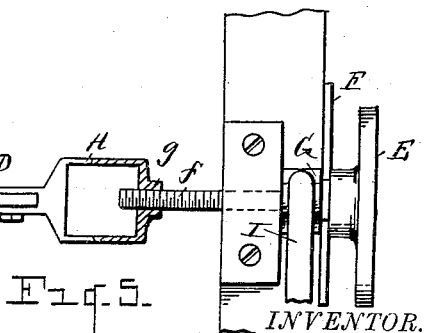

Figure 1 is a perspective view of a sieve or riddle embodying my invention. Fig. 2 is a longitudinal section as on line 2 2 of Fig. 1. Fig. 3 is a central transverse section through the sieve. Fig. 4 is an enlarged detail in section transversely through the hinged bars of the sieve, other parts being broken away. Fig. 5 is an enlarged detail, partly in section, of the means employed for adjusting the sieve-bars.

Referring to the letters of reference, A designates the frame of the sieve, which may be of any suitable construction. Dividing the sieve-frame through its center is a rail B, extending longitudinally thereof.

Located upon opposite sides of the central rail B are the slats C of the sieve, the surfaces of which stand at a slight incline and the lower edges of which are secured to the transverse shafts $a$, which cross the frame of the sieve transversely and the opposite ends of which are journaled in the side rails of the frame. The shafts $a$ at the longitudinal center are each formed into a crank $b$, which is journaled in a movable bar D, extending longitudinally of the sieve, below the slats thereof, and through the medium of which said cranks $b$ are operated to adjust the sieve-slats for purposes hereinafter stated.

The slats C of the sieve are formed, preferably, of thin sheet metal and are provided near their outer or upper edge with a right-angled shoulder $c$, extending longitudinally of said slats. Projecting from the lower edge of the shoulder $c$ of each of said slats is a row of teeth $e$. Said teeth are inclined upwardly on a plane with the incline of the slats and are adapted to extend onto the surface of the slat in advance, as clearly shown in Fig. 4. The spaces between these teeth form a mesh in the slats of the sieve, and by reason of the adjustment of said slats through the medium of the shafts $a$, upon which they are mounted, the mesh in the slat-bars may be regulated for the various sizes and conditions of grain or seed.

The shoulders $c$ of the slats, extending longitudinally thereof, serve to strengthen the slats and at the same time to check the grain as it passes down over the surface of the slats and distribute it evenly, so that it may be properly acted upon by the air-blast coming through the slats from the under side, thereby enabling the air to perfectly clean the grain as it passes through the sieve. The shoulders $c$ also serve to raise the straw and chaff upward from the grain which is arrested by said shoulders, assisting, in conjunction with the movement of the sieve, to effectually separate the straw and chaff from the grain and carry them rearwardly over the surface of the sieve.

The adjustment of the slats of the sieve is accomplished through the medium of a hand-wheel E, supported in a bearing-plate F at the rear of the sieve-frame. Extending inwardly from said wheel is a threaded stem $f$, which passes through a tapped boss $g$ in the yoke H, which is attached to the forward end of the bar D, whereby by turning said wheel the stem $f$ is screwed into or out of said yoke and the bar D is moved longitudinally to actuate the slats of the sieve as required. Upon a portion of the stem $f$ of the wheel E is a polygonal collar G, on which the spring I bears, whereby said wheel is held from turning except when actuated by the operator.

When it is desired to enlarge the mesh of the screen-slats, the wheel E is turned so as to swing the toothed or serrated edges of said slats upwardly, thereby increasing the space between the teeth of one slat and the surface of the succeeding slat over which said teeth extend. To reduce the mesh of said slats, the wheel is turned to carry the toothed edges of the slats downwardly, thereby decreasing the space between said teeth and the surface of the slat adjacent thereto.

It will be observed that by forming the shoulders and the teeth upon the upper edge of said slats the air-blast which passes through said slats from the under side is unimpeded, permitting its unbroken current to act with more force and uniformity upon the grain.

Having thus fully set forth this invention, what is claimed is—

The combination of a frame provided with a center rail extending longitudinally of the frame, a series of transverse slats, each provided near its outer or upper edge with a shoulder extending longitudinally of said slat, teeth extended from the lower edge of the shoulder, said teeth inclined to correspond with the incline of the slat-surfaces under said teeth, a series of shafts having connected thereto the slats, and provided with cranks or bent portions, and means for rocking the shafts and slats, substantially as and for the purpose specified.

In testimony whereof I sign this specification in the presence of two witnesses.

DAVID LIPPY.

Witnesses:
J. H. McGINTY,
JAS. J. MAGUIRE.